US005188690A

United States Patent [19]

Daussan et al.

[11] Patent Number: 5,188,690

[45] Date of Patent: Feb. 23, 1993

[54] METHOD FOR APPLYING A COVERING ON A SUBSTRATE, A DEVICE FOR CARRYING OUT THE METHOD AND A COVERING OBTAINED BY MEANS OF SAID METHOD

[75] Inventors: André Daussan; Gérard Daussan, both of Longeville-Les-Metz; Jean-Charles Daussan, Metz, all of France

[73] Assignee: Daussan et Compagnie, Woippy, France

[21] Appl. No.: 746,890

[22] Filed: Aug. 19, 1991

[30] Foreign Application Priority Data

Aug. 24, 1990 [FR] France ........ 90 10641

[51] Int. Cl.$^5$ ........ B32B 7/14

[52] U.S. Cl. ........ 156/91; 52/2.15; 52/249; 156/71

[58] Field of Search ........ 156/91, 71; 52/2.15, 52/249, 309.8

[56] References Cited

U.S. PATENT DOCUMENTS

| | | | |
|---|---|---|---|
| 2,209,762 | 7/1940 | Bracken | 52/741 |
| 3,118,010 | 1/1964 | Harrington | 52/2.15 X |
| 3,316,685 | 5/1967 | Hensel | 52/741 |
| 3,909,907 | 10/1975 | Davis | 52/249 X |
| 4,155,967 | 5/1979 | South et al. | 52/2.15 X |
| 4,170,093 | 10/1979 | Cappellini et al. | 52/2.15 X |
| 4,835,831 | 6/1989 | Melton | 29/460 |

FOREIGN PATENT DOCUMENTS 376755 7/1932 United Kingdom .

*Primary Examiner*—David A. Simmons
*Assistant Examiner*—Mark A. Osele
*Attorney, Agent, or Firm*—Young & Thompson

[57] ABSTRACT

A method for applying a covering on a substrate consists in embedding a reinforcement (2) in a covering (10). To this end, a number of hooks (3) are fixed on the substrate (1), preferably with variable orientations and/or inclinations with respect to the substrate (1). The reinforcement (2) is inserted in the hooks (3) and the covering (10) is applied on the substrate (1) which carries the reinforcement (2).

The hook (3) which is used as a fastening device is preferably formed by a substantially U-shaped rod, one arm (4) of which has a curvature which is reversed with respect to the curvature of the U-shaped base.

The reinforced covering thus formed can in particular be a fireproof facing applied on a metal substrate.

6 Claims, 2 Drawing Sheets

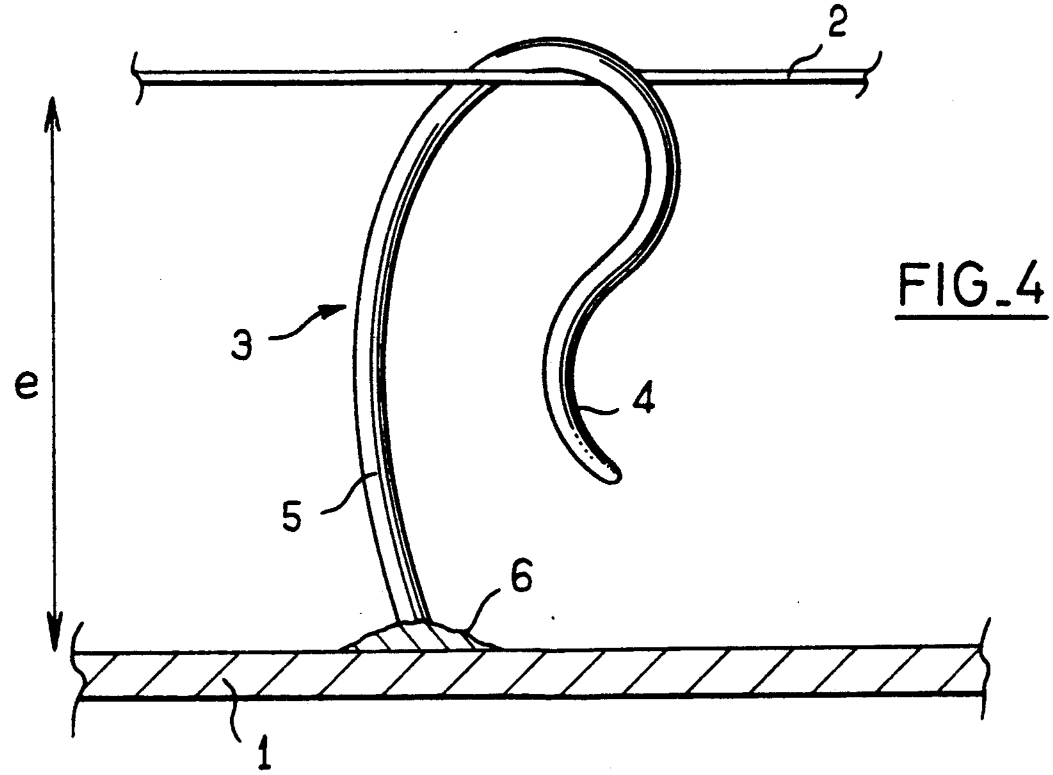
FIG_4
FIG_5
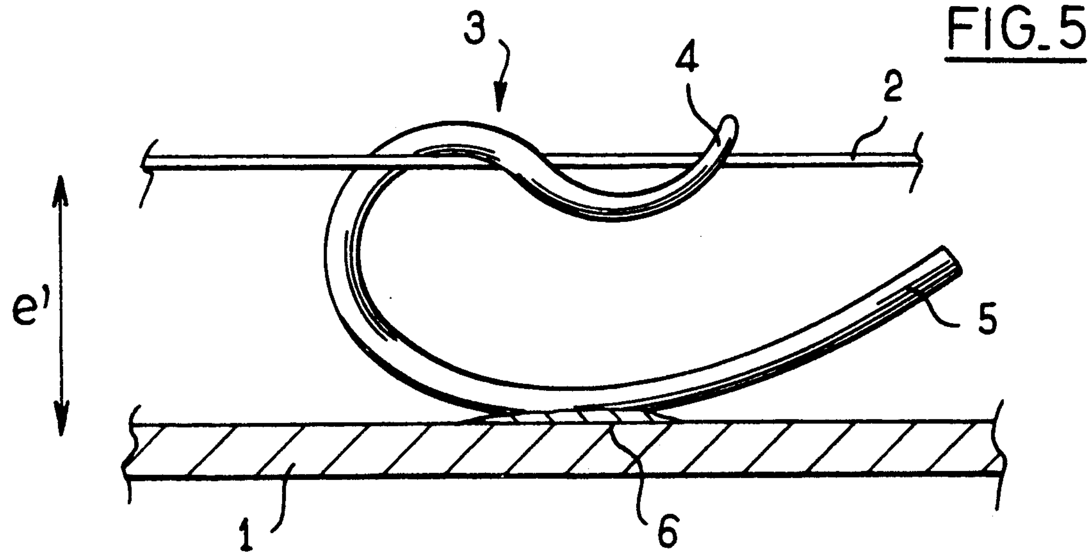
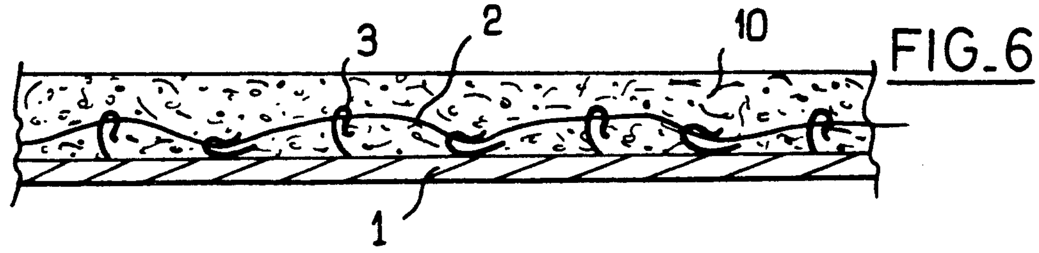
FIG_6

METHOD FOR APPLYING A COVERING ON A SUBSTRATE, A DEVICE FOR CARRYING OUT THE METHOD AND A COVERING OBTAINED BY MEANS OF SAID METHOD

BACKGROUND OF THE INVENTION

1. Field of the Invention

The present invention relates to a method for applying a covering on a substrate such as steel sheets or walls. The invention also relates to a device employed in the practical application of said method. Finally, the invention is concerned with a reinforced covering obtained by means of said method.

2. Description of the Prior Art

In order to improve the adhesion of a relatively thick covering such as a fireproof facing on a substrate, a customary practice consists in embedding a reinforcement in the covering. The reinforcement usually consists of wire-mesh fabric which strengthens the covering and thus prevents it from breaking-away from the substrate.

When the covering is applied on the substrate, the technical problem which arises is that of holding the reinforcement in position on the substrate. The reinforcement is in fact liable to shift, especially if the covering is spray-deposited by means of a jet under pressure. Moreover, it is difficult to control the spacing between the substrate and the reinforcement since said reinforcement has a tendency to be applied against the substrate, with the result that adhesion of the covering is impaired and the strengthening function of the reinforcement is lost. As a rule, the reinforcement should preferably be located at approximately one-half the thickness of the covering in order to strengthen it with maximum efficiency.

The object of the present invention is to provide a method for applying a covering on a substrate which overcomes the disadvantages set forth in the foregoing in order to obtain a strong covering which is securely bonded to the substrate.

SUMMARY OF THE INVENTION

In the method according to the invention, a reinforcement is embedded in the covering in the following steps :

- a plurality of fastening devices are fixed on the substrate;
- the reinforcement is inserted in the fastening devices;
- the covering is applied on the substrate which carries the reinforcement.

Depending on the shape and arrangement of the hooks on the substrate, the reinforcement can be very securely attached to the substrate while maintaining a certain distance between these two components, this distance being variable if necessary.

In an advantageous embodiment of the method according to the invention, the fastening devices are substantially flat hooks which are fixed on the substrate with variable orientations and/or inclinations (erect or prostrate, for example).

The fact of placing the fastening devices or hooks with different orientations and/or inclinations with respect to the substrate prevents any sliding of the reinforcement in a direction parallel to the substrate. This prevents any undesirable displacement of the reinforcement at the time of application of the covering. The reinforcement can thus be placed on the substrate without entailing the steps which consist in applying a first covering layer, then in placing the reinforcement in position and finally in applying a second covering layer. This accordingly simplifies deposition of the reinforced covering and enhances its strength.

In an advantageous embodiment of the method according to the invention, the fastening devices include hooks formed by a rod of metal for example, said rod being bent substantially in the shape of a U and these hooks are fixed on the substrate by means of one arm of the U, for example by welding, adhesive bonding or screwing.

If the substrate is flat, the fastening devices are preferably uniformly distributed over its surface but, if the substrate has folding lines or substantial curves, the density of the fastening devices can be higher in the vicinity of these portions.

In a preferred embodiment of the invention, the hooks are fixed on the substrate at one point of one arm of their substantially U shape, this point being chosen according to the desired spacing between the substrate and the reinforcement. This arrangement of the hooks makes it possible to control the spacing between the substrate and the reinforcement and therefore to make use of identical hooks in order to deposit reinforced coverings having different thicknesses.

In accordance with a preferred embodiment of the invention, it is also possible to fix the hooks so as to produce a variable spacing between the substrate and the reinforcement. Thus the reinforcement has a wavy arrangement which holds it securely on the substrate and also provides maximum strengthening for coverings of substantial thickness.

Another aspect of the invention is concerned with a device which can be fixed on a substrate in order to hold a reinforcement in position thereon in accordance with the above method.

In accordance with the invention, this device comprises a hook formed by a rod bent substantially in the shape of a U, one of the arms of which has a curvature which is reversed with respect to the curvature of the base of the substantially U-shaped portion.

The invention is also concerned with a covering applied on a substrate in accordance with the above method. The covering thus includes a reinforcement embedded in the covering, the reinforcement being inserted in fastening devices fixed on the substrate in positions which are preferably variable with respect to the substrate.

BRIEF DESCRIPTION OF THE DRAWINGS

FIGS. 4 and 5 are views in greater detail showing two hooks fixed in accordance with the method of the invention.

FIG. 6 illustrates schematically one embodiment of the method in accordance with the invention.

DETAILED DESCRIPTION OF THE INVENTION

In the field of the invention, it is proposed to apply a covering 10 on a substrate 1 such as a steel wall, for example, the covering 10 in question being intended to have a reinforcement 2 in the form of wire-mesh fabric or the like. Several types of covering thus fall within the scope of the invention and include, for example, fire-resistant, moisture-resistant, heat-insulating, ornamental or other types of facings. In the non-limitative description given below, consideration is given to the particular example of a fireproof facing 10 applied on a metallic substrate 1 which forms part of a building structure. The substance which constitutes one example of a fireproof facing of this type is described in Patent No. FR-A-2 458 519 granted to the present Applicant. This substance is designed to offer a certain degree of heat resistance, especially in the event of fire.

Figure 1:
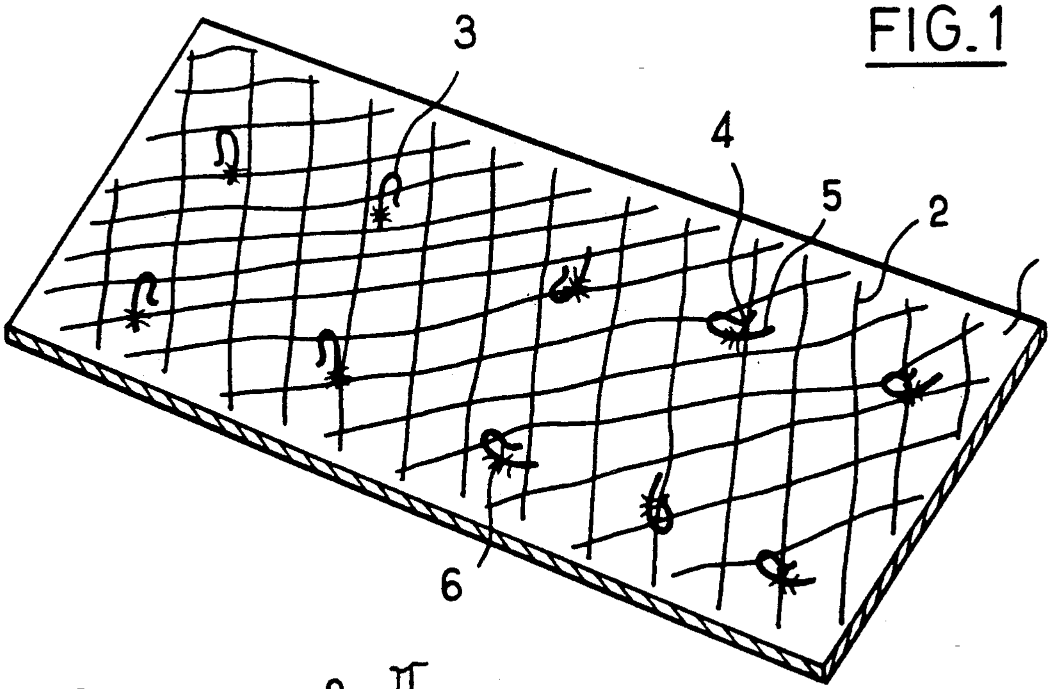
FIG. 1 is a view in perspective of a substrate containing a reinforcement placed in accordance with the method of the invention.

In FIG. 1, there is shown a metallic substrate 1 on which the wire-mesh reinforcement 2 has been placed prior to application of the covering 10.

Strands of the reinforcement 2 are inserted, if necessary after deformation, in hooks 3 which are fixed on the substrate 1 in order to secure the reinforcement 2 to the substrate 1. These hooks 3 have an identical predetermined structure, each constitute individual fastening means and are fixed in spaced relation on the substrate 1 in different positions with respect to said substrate.

Figure 3:
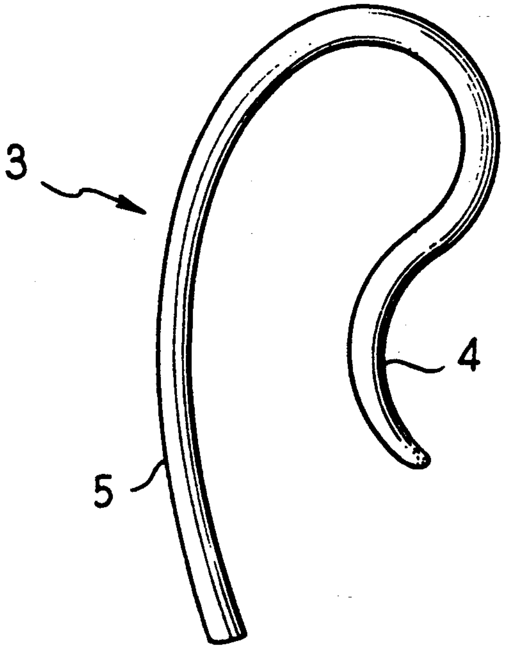
FIG. 3 is a side view of a hook in accordance with the invention.

The structure of the hooks 3 employed is illustrated in FIG. 3. The hook 3 consists of a metal rod bent in the shape of a U having a rounded base, the two arms 5 and 4 of which have a curvature respectively in the same direction and in the opposite direction with respect to the curvature of the base of the U.

The hooks 3 can also be sheathed in plastic, in particular if they are intended to be in contact with a highly acid covering. The hooks can also be made of rigid synthetic material or else of ceramic material. In both cases, they are advantageously fixed on the substrate by adhesive bonding or screwing in preformed internally-threaded bores.

Figure 2:
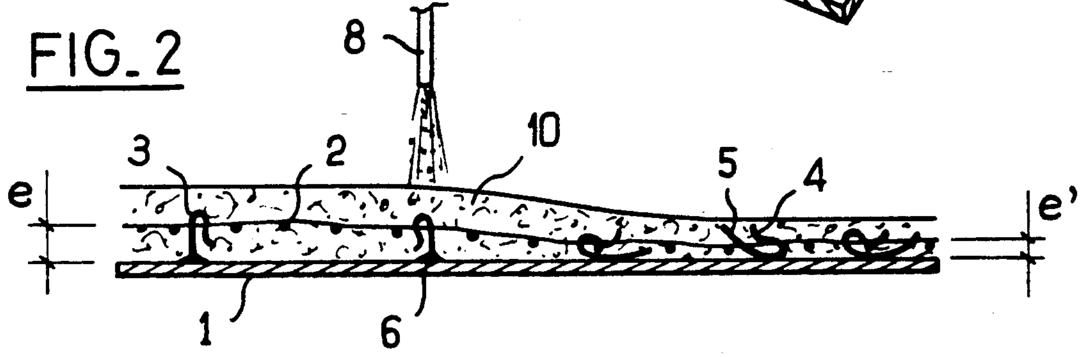
FIG. 2 is a view in elevation of the substrate of FIG. 1 after application of the covering.

It is apparent from FIGS. 1 and 2 that the hooks 3 which are assumed to be of metal are welded to the substrate 1 at one point of the arm 5 of their U-shape which has a curvature in the same direction as the base of the U. The position of this point of attachment along the arm 5 is chosen according to the desired spacing between the substrate 1 and the reinforcement 2 which is inserted in the hook 3. Thus, as illustrated in FIG. 2 and to a larger scale in FIGS. 4 and 5, some hooks 3 can be welded by means of a weld spot 6 located in the vicinity of the end of the arm 5, thus resulting in a relatively large spacing e between the substrate 1 and the inserted reinforcement 2 which is well-suited to the application of a covering 10 of substantial thickness whilst other hooks 3 can be welded at a point nearer the base of the U (as shown in FIG. 5), thus producing a smaller spacing e' between the substrate 1 and the inserted reinforcement 2, which is preferred for the application of a covering 10 of smaller thickness.

From this it follows that identical hooks 3 can advantageously be employed for applying coverings having different thicknesses, typically within the range of 5 mm to several centimeters. As will be readily apparent, the dimensions of the hooks 3 can be chosen according to the desired spacing between the substrate 1 and the reinforcement 2.

In FIG. 1, it is also apparent that some hooks 3 have different orientations when they are fixed on the substrate 1. More specifically, the plane defined by the substantially U-shaped structure of the hooks 3 has a variable orientation with respect to the plane defined by the substrate 1. The variable orientation can be a variable inclination or a variable azimuth. This random orientation of the hooks 3 prevents any slipping of the reinforcement 2 in a direction parallel to the substrate 1 during application of the covering. When the hooks 3 are oriented in the same manner, the reinforcement 2 is liable to escape from the hooks 3 by passing beneath their free arms 4. This is prevented by the arrangement of the hooks 3 with a variable and preferably random orientation.

Another step of the method in accordance with the invention consists in applying the covering 10 on the substrate 1 on which the reinforcement 2 is supported and held in position by the hook devices 3.

In FIG. 2, there is shown diagrammatically a pipe 8 through which the material forming the covering 10 is distributed under pressure. The method of application of the material constituting the fire-resistant covering 10 is described in detail in Patent No. FR-A-2 458 519 granted to the present Applicant and cited here by way of reference. It is apparent from FIG. 2 that the covering 10 which is formed can have different thicknesses according to the spacing e, e' between the substrate 1 and the reinforcement 2 owing to the variable positions which can be assumed by the hooks 3. Preferably, the reinforcement 2 is placed approximately at one-half the thickness of the covering 10.

In the embodiment of the invention which is illustrated in FIG. 6, the hooks 3 are disposed alternately on the substrate 1 so as to form a wavy configuration of the reinforcement 2. This wavy configuration ensures that the reinforcement is more securely held in position on the substrate and is suitable for consolidation of a covering 10 of substantial thickness, which is not usually possible with conventional reinforced covering techniques. As will be readily understood, the alternate arrangement of the hooks is not the only one which permits a variable spacing between the substrate 1 and the reinforcement 2. The essential requirement to be met consists in mounting a certain number of hooks 3 so as to provide a relatively small spacing e' (as shown in FIG. 5) whilst others are mounted so as to provide a relatively substantial spacing e (as shown in FIG. 4).

It is readily apparent that, within the scope of the invention, the reinforcement 2 can be inserted in the hooks 3 either before or after they have been fixed on the substrate 1 as may be preferred by technical experts. Similarly, a wire-mesh reinforcement 2 is only one non-limitative example of a reinforcement which can be employed within the scope of the invention. It is of course possible to employ any known reinforcement which permits insertion in the fastening devices such as, for example, a perforated steel sheet or else a reinforcement of synthetic material.

Other alternatives may also be conceived without difficulty by those versed in the art without thereby departing from the field of application of the invention. Thus the fastening devices could be of the pigtail-hook type.

What is claimed is:

1. A method for applying a covering on a substrate, wherein a reinforcement is embedded in the covering, comprising the following steps:

fastening on the substrate a plurality of spaced fastening devices, which are curved U-shaped hooks, with the hooks fastened to the substrate at a plurality of different places along the length of various ones of the hooks, so that different hooks are fastened to the substrate at various parts of the hooks;

inserting a reinforcement in the hooks, the reinforcement extending between the hooks and being spaced from the substrate; and covering the substrate and the hooks and the reinforcement with a heat-resistant substance a portion of which is disposed between the reinforcement and the substrate.

2. A method as claimed in claim 1, wherein the fastening devices are fixed on the substrate at different inclinations with respect to the substrate.

3. A method as claimed in claim 1, wherein the fastening devices are of metal and are fixed on the substrate by welding.

4. A method as claimed in claim 1, wherein the fastening devices are of plastic and are attached to the substrate by adhesive bonding.

5. A method as claimed in claim 1, wherein the fastening devices are of ceramic material and are fastened to the substrate by adhesive bonding.

6. A method as claimed in claim 1, wherein the fastening devices are secured to the substrate in such orientations as to provide a variable spacing between the substrate and the reinforcement.

* * * * *